United States Patent
Handte et al.

(10) Patent No.: US 11,272,521 B2
(45) Date of Patent: Mar. 8, 2022

(54) SPATIAL REUSE FOR SCHEDULED DATA TRANSFER PERIODS

(71) Applicant: Sony Corporation, Tokyo (JP)

(72) Inventors: Thomas Handte, Stuttgart (DE); Dana Ciochina, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 159 days.

(21) Appl. No.: 16/623,406

(22) PCT Filed: Jul. 6, 2018

(86) PCT No.: PCT/EP2018/068404
§ 371 (c)(1),
(2) Date: Dec. 17, 2019

(87) PCT Pub. No.: WO2019/008149
PCT Pub. Date: Jan. 10, 2019

(65) Prior Publication Data
US 2020/0120690 A1    Apr. 16, 2020

(30) Foreign Application Priority Data

Jul. 6, 2017   (EP) ..................................... 17180052

(51) Int. Cl.
*H04B 7/00*     (2006.01)
*H04W 72/12*    (2009.01)
(Continued)

(52) U.S. Cl.
CPC ...... *H04W 72/1231* (2013.01); *H04B 17/309* (2015.01); *H04W 72/042* (2013.01);
(Continued)

(58) Field of Classification Search
CPC ............... H04W 16/14; H04W 28/048; H04W 72/1231; H04W 72/042; H04W 72/046;
(Continued)

(56) References Cited

U.S. PATENT DOCUMENTS 7,437,166 B2 * 10/2008 Osseiran .............. H04B 7/0408
455/452.1
8,542,655 B2 *  9/2013 Kuroda ................... H04L 5/005
370/332

(Continued)

FOREIGN PATENT DOCUMENTS

EP        1991017 A1    11/2008
EP        1668941 B1     4/2009
(Continued)

OTHER PUBLICATIONS

International Search Report and Written Opinion dated Oct. 16, 2018 for PCT/EP2018/068404 filed on Jul. 6, 2018, 12 pages.

(Continued)

*Primary Examiner* — Dmitry Levitan
(74) *Attorney, Agent, or Firm* — Xsensus LLP

(57) ABSTRACT

Communication device for communicating within a group of communication devices. The communication device comprising circuitry configured to listen to a training and control period of a further communication device which is acting as a wireless network coordinator of a further group of communication devices and transmits frames with a succession of directive beams, each identified by a transmit sector and to generate reception quality information associating each transmit sector with a quality indicator indicative of a reception quality of the received frames. Further, the circuitry is configured to obtain scheduling information from the further communication device including at least one scheduled data transfer period with transmit sector information associated therewith, and to generate scheduled data transfer periods for the group of communication devices based on the reception quality information and the scheduling information, including the transmit sector information, (Continued)

| Sector AP1 | Sector AP2 | Quality Indicator ∈ {+,o,−} | Potential spatial reuse sector pair? |
|---|---|---|---|
| S0 | S0' | − | Yes |
|    | S1' | − | Yes |
|    | S2' | + | No |
| S1 | S0' | − | Yes |
|    | S1' | + | No |
|    | S2' | + | No |
| S2 | S0' | − | Yes |
|    | S1' | o | N/A |
|    | S2' | o | N/A |
| S3 | S0' | − | N/A |
|    | S1' | − | Yes |
|    | S2' | o | N/A |

600 such that interference levels at the further communication device and/or another communication device are minimized.

23 Claims, 12 Drawing Sheets

(51) Int. Cl.
*H04B 17/309* (2015.01)
*H04W 72/04* (2009.01)
*H04W 72/08* (2009.01)
*H04W 74/08* (2009.01)
*H04W 84/12* (2009.01)

(52) U.S. Cl.
CPC ....... *H04W 72/046* (2013.01); *H04W 72/082* (2013.01); *H04W 72/121* (2013.01); *H04W 74/0816* (2013.01); *H04W 84/12* (2013.01)

(58) Field of Classification Search
CPC . H04W 72/082; H04W 72/121; H04W 76/14; H04W 84/10; H04W 84/12
USPC .......................................... 370/310, 328, 329
See application file for complete search history.

(56) References Cited

U.S. PATENT DOCUMENTS

| | | | | |
|---|---|---|---|---|
| 8,688,134 | B2* | 4/2014 | Lee | H04W 72/0426 |
| | | | | 455/450 |
| 8,913,550 | B2* | 12/2014 | Cordeiro | H04W 16/14 |
| | | | | 370/328 |
| 10,117,105 | B2* | 10/2018 | Li | H04W 72/1226 |
| 10,129,814 | B2* | 11/2018 | Li | H04W 40/32 |
| 10,292,163 | B2* | 5/2019 | Shen | H04W 76/14 |
| 10,314,064 | B2* | 6/2019 | Feng | H04W 72/1226 |
| 10,375,621 | B2* | 8/2019 | Li | H04W 16/28 |
| 10,461,819 | B2* | 10/2019 | Chen | H04B 7/088 |
| 10,477,452 | B1* | 11/2019 | Jiang | H04W 72/046 |
| 10,616,775 | B2* | 4/2020 | Kim | H04B 7/0695 |
| 10,616,844 | B2* | 4/2020 | Zhu | H04L 5/00 |
| 2016/0165630 | A1* | 6/2016 | Oteri | H04W 74/04 |
| | | | | 370/336 |
| 2016/0255660 | A1* | 9/2016 | Son | H04W 76/40 |
| | | | | 370/329 |
| 2016/0316375 | A1 | 10/2016 | Li | |
| 2016/0316484 | A1 | 10/2016 | Feng | |
| 2020/0120690 | A1* | 4/2020 | Han | H04W 72/042 |

FOREIGN PATENT DOCUMENTS

| | | |
|---|---|---|
| EP | 2523499 A2 | 11/2012 |
| WO | 2015/005745 A1 | 1/2015 |

OTHER PUBLICATIONS

"Part 11: Wireless LAN Medium Access Control (MAC) and Physical Layer (PHY) Specifications, Amendment 3: Enhancements for Very High Throughput in the 60 GHz Band," IEEE Standard for Information Technology—Telecommunications and information exchange between systems—Local and metropolitan area networks-Specific Requirements, IEEE Std 802.11adTM-2012, IEEE, NY, USA, Dec. 28, 2012, 628 pages.

"Part 11: Wireless LAN Medium Access Control (MAC) and Physical Layer (PHY) Specifications," IEEE Standard for Information technology—Telecommunications and information exchange between systems Local and metropolitan area networks—Specific requirements, IEEE Std 802.11-2016, IEEE, NY, USA, Dec. 14, 2016, 3534 pages.

"Part 11: Wireless LAN Medium Access Control (MAC) and Physical Layer (PHY) Specifications, Amendment 7: Enhanced throughput for operation in license-exempt bands above 45 GHz," Draft Standard for Information Technology—Telecommunications and Information Exchange Between Systems—Local and Metropolitan Area Networks—Specific Requirements, IEEE P802.11ayTM/ D0.4, IEEE, NY, USA, May 2017, 259 pages.

\* cited by examiner

SPATIAL REUSE FOR SCHEDULED DATA TRANSFER PERIODS

CROSS-REFERENCE TO RELATED APPLICATIONS

The present application is based on PCT filing PCT/EP2018/068404, filed Jul. 6, 2018, and claims priority to EP 17180052.7, filed Jul. 6, 2017, the entire contents of each are incorporated herein by reference.

BACKGROUND

Field of the Disclosure

The present disclosure relates to a communication device for communicating within a group of communication devices and operating in close vicinity to a further communication device acting as a wireless network coordinator of a further group of communication devices. Furthermore, the present disclosure relates to a corresponding communication method.

Description of Related Art

In wireless communication systems generally two types of channel access are known. On the one hand, there is contention based access in which several subscribers compete for channel access and request for transmission time, e.g. via ready/request to send (RTS) and clear to send (CTS) exchange with a coordinating station (e.g. and access point (AP)) or CTS-to-self. On the other hand, there is channel access based on scheduled services in which a coordinating station (e.g. AP) allocates dedicated time slots to individual stations (STA).

In wireless gigabit systems according to IEEE 802.11ad/ay both channel access mechanism may be utilized, i.e. channel access in wireless gigabit systems can have contention based access periods (CBAP) and scheduled data transfer periods (SP) at different times.

The type of channel access and when it is to be used is announced by a central network coordinator (e.g. an AP) at the beginning of each beacon interval (BI). Accordingly, each beacon interval starts with a beacon header interval (BHI) that includes an extended schedule element (ESE) which outlines the channel access or the following data transmission interval (DTI) of the beacon interval. The ESE can signal the use of various different allocation patterns. Additionally, SP access times may also be requested by STAs themselves and be granted by the central coordination point afterwards.

When several network coordinators operate on the same channel and in close vicinity to each other, communication between both network coordinators and their associated STAs can interfere and reduce throughput. For that reason, AP clustering has been introduced in IEEE 802.11ad, where neighbouring network coordinators listen to each other during BHI, extract information of the ESE and schedule CBAPs and SPs such that they do not overlap in time. Thereby, interference is kept low and throughput is greater as in a nonaligned data transmission.

Nevertheless, this procedure comes with the drawback that only one network coordinator can transmit at a time and thus a data rate is being reduced proportionally if multiple network coordinators share transmission time equally based on this procedure. Thus, there is a demand for an improved procedure which yields greater throughput if two or more network coordinators coexist and share the same channel.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a communication device for communicating within a group of communication devices which provides greater throughput if operating in close vicinity to a further communication device acting as a wireless coordinator for a further group of communication devices. It is a further object to provide a communication method for communication within in a group of communication devices which provides greater throughput if the communication device is operating in close vicinity to a further communication device which is acting as a wireless network coordinator for another group of communication devices as well as a corresponding computer program for implementing the disclosed communication method and a corresponding non-transitory computer-readable recording.

According to an aspect there is provided a communication device for communicating within a group of communication devices, the communication device comprising circuitry configured to listen to a training and control period of a further communication device which is acting as a wireless network coordinator of a further group of communication devices and transmits frames with a succession of directive beams, each identified by a transmit sector, to generate reception quality information associating each transmit sector with a quality indicator indicative of a reception quality of the received frames, to obtain scheduling information from the further communication device including at least one scheduled data transfer period with transmit sector information associated therewith, and to generate scheduled data transfer periods for the group of communication devices based on the reception quality information and the scheduling information, including the transmit sector information, such that interference levels at the further communication device and/or another communication device are minimized.

According to a further aspect there is provided a communication method for a communication device communicating within a group of communication devices, the method comprising the steps of: listening to a training and control period of a further communication device which is acting as a wireless network coordinator of a further group of communication devices and transmits frames with a succession of directive beams, each of which being associated with a transmit sector, generating reception quality information associating each transmit sector with a quality indicator indicative of a reception quality of the received frames, obtaining scheduling information from the further communication device including at least one scheduled data transfer period with transmit sector information associated therewith, and generating scheduled data transfer periods for the group of communication devices based on the reception quality information and the scheduling information, including the transmit sector information, such that interference levels at the further communication device and/or another communication device are minimized.

According to yet a further aspect there is provided a communication device acting as a wireless network coordinator comprising circuitry configured to generate schedule information which schedules scheduled data transfer periods for a data transfer interval of a transmission interval, to indicate within the schedule information scheduled data transfer periods capable of spatial reuse, to associate transmit sector information with each scheduled data transfer period capable of spatial reuse, and to transmit the schedule information for the transmission interval as part of a training and control period of said transmission interval.

According to yet a further aspect there is provided a communication device within a group of communication devices comprising circuitry configured to decode schedule information received from a communication device acting as network coordinator, and to determine if a scheduled data transfer period within the schedule information is a directional scheduled data transfer period and if the directional scheduled data transfer period being capable of spatial reuse/sharing.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication device and as defined in the dependent claims and/or disclosed herein.

One of the aspects of the disclosure is to improve throughput if communication devices operating in the mm-Wave band operate in close vicinity to each other, and in particular, if the communication devices are providing network coordination functions for different groups of communication devices. The disclosed solution offers such an improvement by scheduling and allocating scheduled data transfer periods simultaneously. This becomes feasible by utilizing spatial sharing by means of beamforming. According to one aspect of the present disclosure, different network coordinators are allowed to schedule directional scheduled services periods at the same time by using non-overlapping beams. In other words, a communication device according to the present disclosure allows allocating of scheduled services periods simultaneously, yet spatially differentiated. Thereby, throughput can be significantly enhanced if two or more network coordinators operate in close vicinity to each other.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
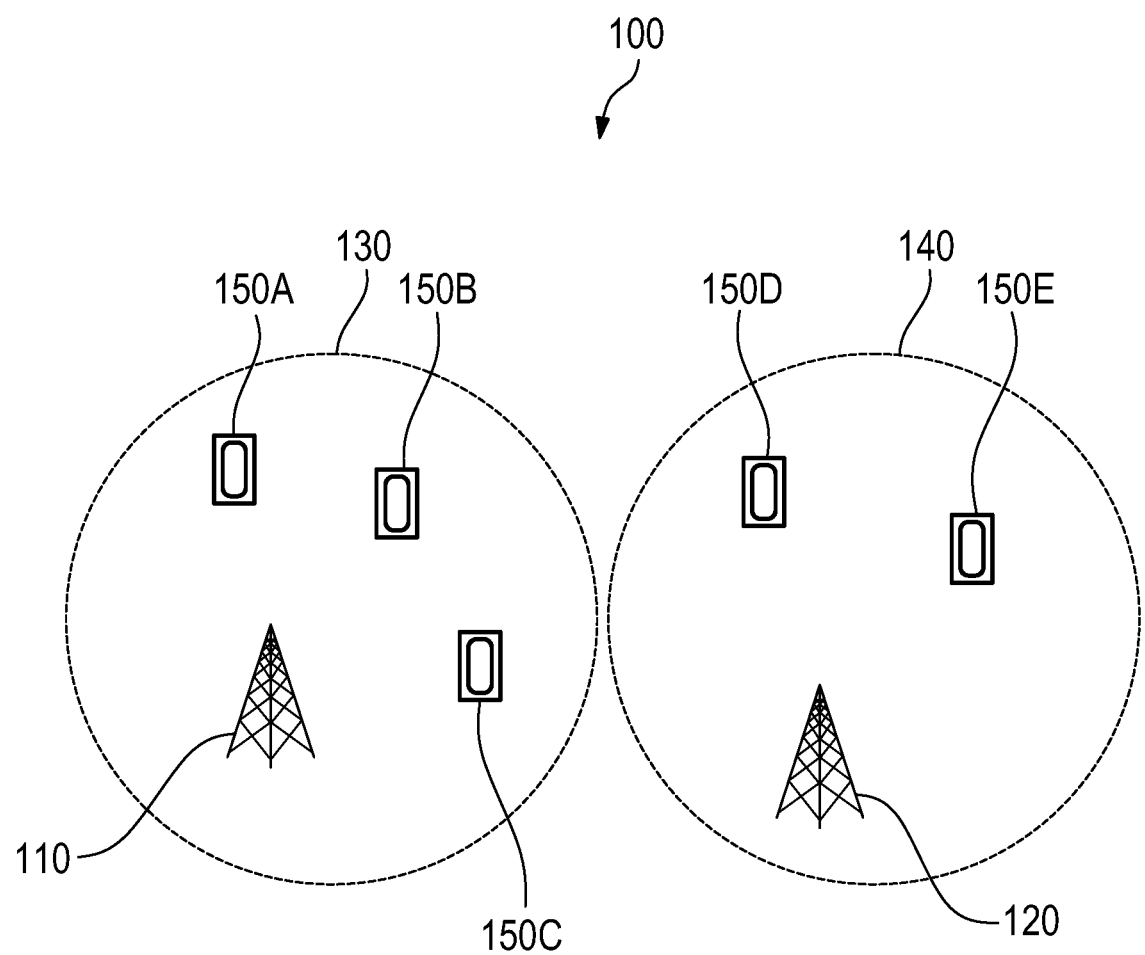
FIG. 1 shows an exemplary embodiment of a communication system according to the present disclosure.

Referring now to the drawings, wherein like reference numerals designate identical or corresponding parts throughout the several views, FIG. 1 shows an exemplary embodiment of a communication system according to the present disclosure. The communication system as a whole is denoted here with reference numeral 100.

The communication system 100 is a wireless communication system which operates at high frequency beyond 30 GHz in the so-called millimeter (mm-Wave) band. In particular, the communication system 100 operates at around 60 GHz. In the example as illustrated in FIG. 1, the communication system 100 comprises a first communication device 110 and a second communication device 120, each defining its own basic service set (BSS) in which it acts as a central network coordinator. A basic service set provides the basic building-block of an IEEE 802.11 wireless LAN and may comprise a single access point (AP) acting as a central coordinator with associated stations (STAs) or two or more devices communicating in an ad-hoc manner with one of the devices acting as the central coordinator. A station and a network coordinator are both communication devices, wherein a network coordinator serves one or more stations which define a basic service set.

Here, the first communication device 110 acts as the central network coordinator (e.g. as a first AP) for the first basic service set 130, and the second communication device 120 acts as the central network coordinator (e.g. as a second AP) for the second basic service set 140. The communication system 100 comprises further stations 150A, 150B, 150C, 150D, 150E each being associated with either the first or the second communication device 110, 120. Each station 150A, 150B, 150C associated with the first communication device 110 belongs to the first basic service set 130 and each station 150D, 150E associated with the second communication device 120 belongs to the second basic service set 140.

The first and the second communication device 110, 120 are operated in close vicinity to each other such that communication between the first communication device 110 and its associated stations 150A, 150B, 150C may interfere with a communication between the second communication device 120 and its associated stations 150D, 150E if both communication devices 110, 120 utilize the same channel. Generally, such interference can be avoided by contention based access mechanisms; however, if scheduled data transfer periods are to be used, coordination between the first and the second communication device 110, 120 will be required.

For this reason, a coordination mechanism, so-called AP clustering, has been introduced in which neighboring network coordination devices such as APs listen to each other and align their scheduled services such that they do not overlap in time.

According to the present disclosure, the communication system according to FIG. 1 further comprises means to coordinate scheduled data transfer periods of different network coordinators not only by time, but also spatially. In other words, the communication system 100 according to the present disclosure is able to allow the first and the second communication device 110, 120 to schedule directional scheduled services periods at the same time by using non-overlapping beams. Thereby, the throughput can significantly be enhanced. Details of the new approach will be explained hereinafter with respect to the FIGS. 4 to 12.

Figure 2:
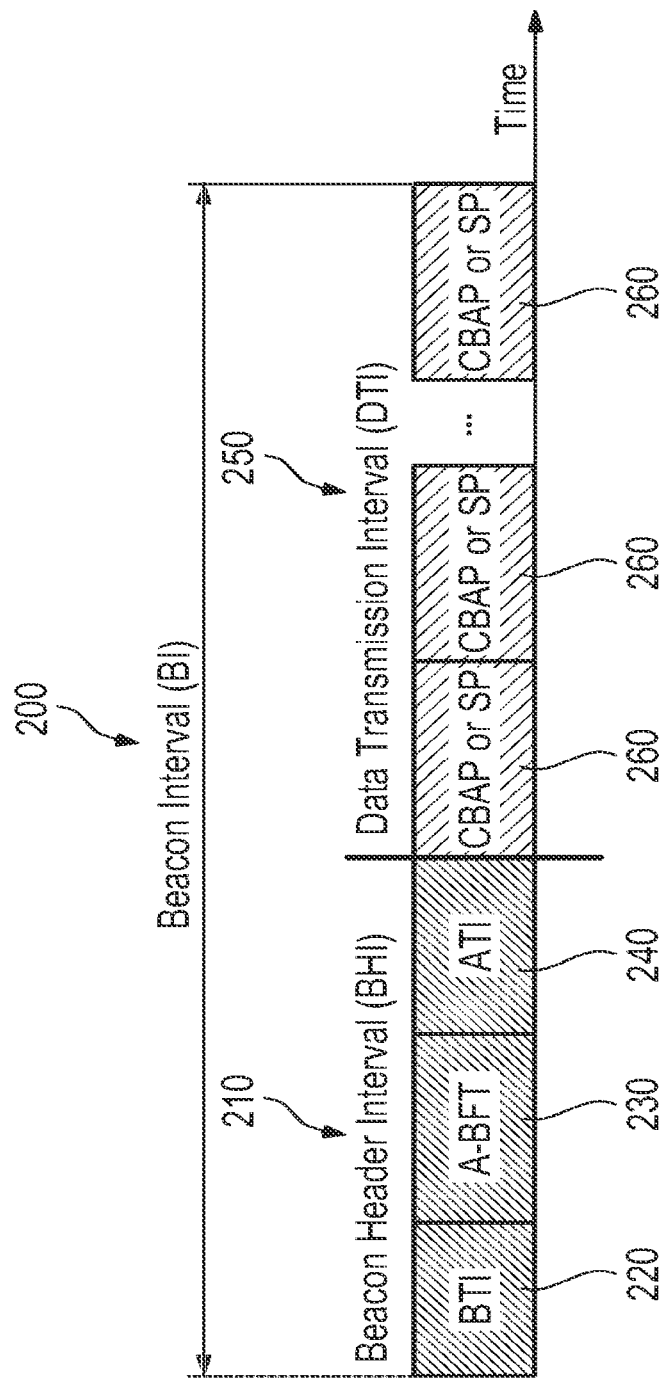
FIG. 2 shows a schematic diagram of a beacon interval structure according to IEEE 802.11ad/ay.

However, before details of the new approach are explained, some general explanation on how traffic in a wireless network according to the IEEE 802.11ad/ay is organized shall be provided. In this regard, FIG. 2 shows a schematic diagram of a beacon interval structure according to IEEE 802.11ad/ay.

According to IEEE 802.11 medium access is generally organized through periodically reoccurring transmission intervals 200, the so called beacon intervals (BI). In lower frequency bands the transmission intervals are initiated by a single beacon frame which is transmitted omni-directionally by a central network coordinating device. The beacon announces the existence of a Wi-Fi network and carries further management data. The rest of the beacon interval is used for data transmission between the stations, usually following a contention based access scheme.

For wireless communication in the mm-Wave band this concept has been extended (IEEE 802.11ad/ay) to cope with the challenges of mm-Wave propagation, in particular, taking into account its directivity. Accordingly, a transmission interval is initiated with a training and control period 210, a so called beacon header interval (BHI) that replaces the single beacon frame of legacy Wi-Fi networks. The BHI facilitates the exchange of management information and network announcements using a sweep of multiple directionally transmitted frames. The BHI sweeping mechanism overcomes increased attenuation and unknown direction of unassociated devices.

The BHI consists of up to three sub-intervals, the beacon transmission interval (BTI) 220, the association beamforming training (A-BFT) 230 and the announcement transmission interval (ATI) 240. During the beacon transmission interval 220 multiple beacon frames are transmitted, each on a different sector to cover all possible directions. This interval is used for network announcement and beamforming training of the coordination device's antenna sectors. The association beamforming training 230 is used by stations to train their antenna sector for communication with the coordination device, and during the announcement transmission interval 240, the coordination device exchanges management information with associated and beam-trained stations. While communication during BTI and A-BFT uses a low complexity modulation and coding scheme to increase range for untrained beams, communication during the ATI takes place with beam-trained stations and thus is more efficient.

The BHI is followed by a data transmission interval (DTI) 250. The DTI comprises of one or more contention-based access periods (CBAPs) or scheduled data transfer periods (SPs) 260 in which stations exchange data frames. While in CBAP multiple stations can contend for channel access based on the IEEE 802.11 enhanced distributed coordination function (EDCF), an SP is assigned for communication between a dedicated pair of nodes as a contention free period.

If two or more network coordinators operate in close vicinity to each other and want to use dedicated scheduled data transfer periods, coordination is required to avoid interferences. An example of such coordination according to the prior art is illustrated in FIG. 3.

Figure 3:
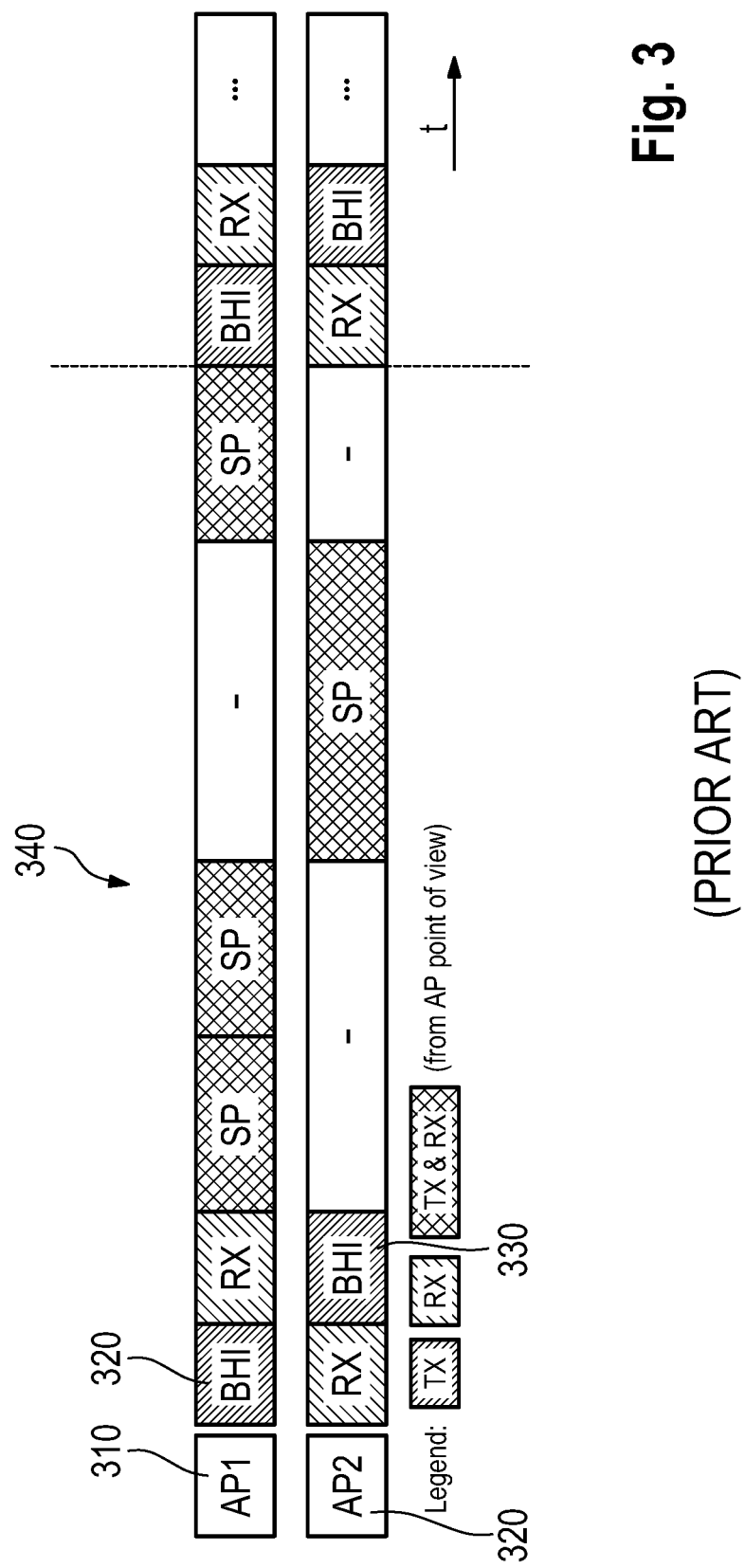
FIG. 3 shows in a schematic diagram the different transmission and reception periods of two network coordinators over time and the allocation of scheduled data transfer periods according to the prior art.

FIG. 3 shows in a schematic diagram the different transmission (Tx) and reception (Rx) periods of two network coordinators 310, 320 over time t and the respective allocation of SPs. The network coordinators 310, 320 are denoted here as AP1 and AP2.

At first, AP2 listens to the BHI 320 of AP1, and subsequently AP1 listens to the BHI 330 of AP2. From the BHIs, both network coordinators AP1 and AP2 can extract an extended schedule element (ESE) which holds information of the allocation of medium access types for the current BI 340. Both network coordinators AP1 and AP2 are obliged to not allocate the whole BI with SPs, but to leave some periods unallocated (which are denoted here by a blank box with a dash). Based on the allocation information of AP1, AP2 is able to allocate its SPs accordingly by avoiding any overlap in time.

According to this scheme only one network coordinator can transmit at a time, and if multiple coordinators share transmission time equally, the data rate will decrease proportionally. Based on this basic concept the present disclosure proposes an enhanced allocation of scheduled services periods using spatial sharing by means of beamforming. The underlying communication method of the new approach is outlined in detail with reference to FIG. 4.

Figure 4:
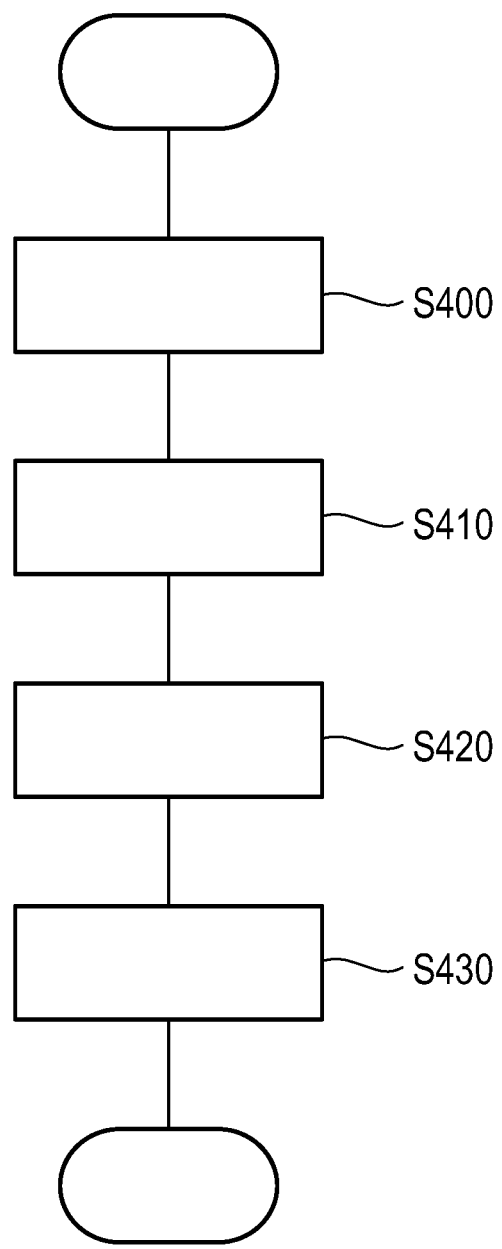
FIG. 4 shows in a schematic diagram an exemplary embodiment of the new communication method according to the present disclosure.

FIG. 4 shows in a schematic diagram an exemplary embodiment of the new communication method according to the present disclosure. The method is executed by a processor of a communication device, which is acting here as a wireless network coordinator of a group of communication devices, forming a first basic service set, in order to coordinate its allocation of scheduled data transfer periods with further network coordinators in its close vicinity. The allocation utilizes spatial sharing by means of beamforming in order to allow scheduled data transfer periods from different network coordinators to be scheduled at the same time by using non-overlapping beams. In other words, scheduled data transfer periods can be differentiated not only by a time differentiator, but also by a spatial differentiator.

In the first step S400, the communication device listens to a training and control period of a further communication device which is acting as a wireless network coordinator of a further group of communication devices and transmits frames with a succession of directive beams, each being associated with a transmit sector. Details of such a sector sweep will be described in more detail with regard to FIGS. 5a and 5b.

Figure 6:
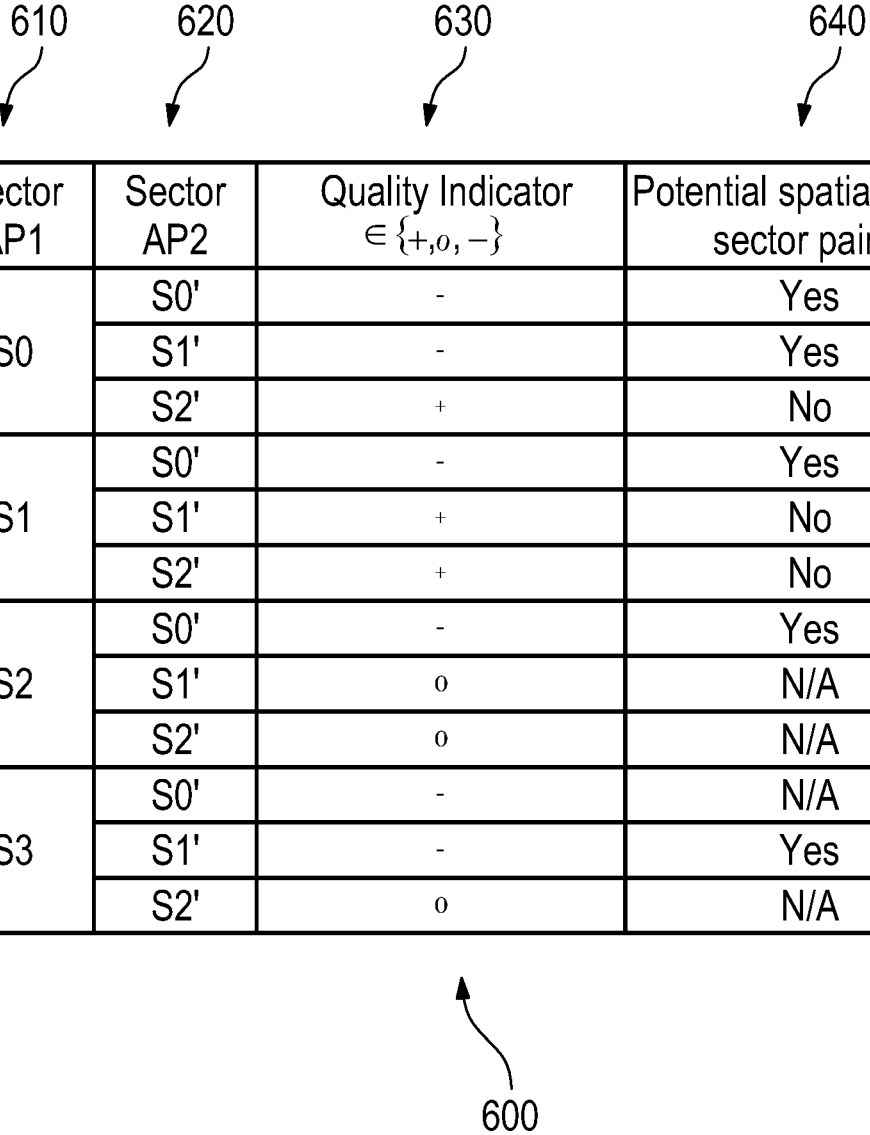
FIG. 6 shows an exemplary sector quality table according to the present disclosure.

In step S410, the communication device generates reception quality information associating each transmit sector with a quality indicator indicative of a reception quality of the received frames. In particular, the communication device notes for each received frame the associated unique transmit sector label and the reception quality, for instance, in terms of its received signal strength indicator (RSSI), its signal to noise ratio (SNR) or a capacity measure. The reception quality information can be best visualized as a table holding, for each frame, the sector label and the related quality information. An exemplary sector quality table is illustrated in FIG. 6 and will be explained in detail later on.

In step S420, the communication device decodes scheduling information from the further communication device including at least one scheduled data transfer period with transmit sector information associated therewith. The scheduling information can be extracted from the schedule information, which is transmitted by the further communication device during the BHI. In particular, the scheduling information includes transmit sector information associated with each scheduled data transfer period. The transmit sector information indicates to which sector a transmission beam that will be used for data transmission during the corresponding scheduled data transfer period belongs to. Typically, the number of sectors swept during BHI is low and applied beams are rather coarse compared to the beams used for the subsequent data transfer. Thus, the advertised transmit sector refers to the sectors trained in BHI, i.e. in case much finer beams are used for communication within an allocation, the advertised sector shall be that sector which has been trained in BHI and comprises the fine beam.

In step S430, the communication device generates scheduled data transfer periods for the group of communication devices based on the reception quality information and the scheduling information, including the transmit sector information, such that interference levels at the further communication device and/or another communication device is minimized. The other communication device can be inter alia a device served by the communication device and/or a device aiming to associate to the communication device.

In other words, according to the present disclosure a spatial sharing schedule is created by combining the reception quality information with the enhanced scheduling information in order to determine if for a scheduled data transfer period of the further communication device spatial reuse is feasible or not. If the communication device determines that the reception quality of a beacon frame transmitted in the specified sector was below a certain threshold, the communication device will schedule a directional scheduled data transfer period of its own simultaneously to the scheduled data transfer period of the further communication device. Thereby, greater throughput can be achieved, while interference levels can be kept low or are avoided completely.

It shall be noted that the communication method according to the present disclosure is not limited to the above outline. Additional steps may be included, some steps may be combined and others may be performed in conjunction with other functions of the communication device. Furthermore, the method steps are not confined to the disclosed order and information acquired during one step may be used multiple times during following steps or during a subsequent run of the procedure in which the particular step is not repeated.

Hereinafter, with respect to the FIGS. 5a and 5b the concept of a sector sweep as part of the beam training during BHI will be explained in greater detail.

Figure 5A:
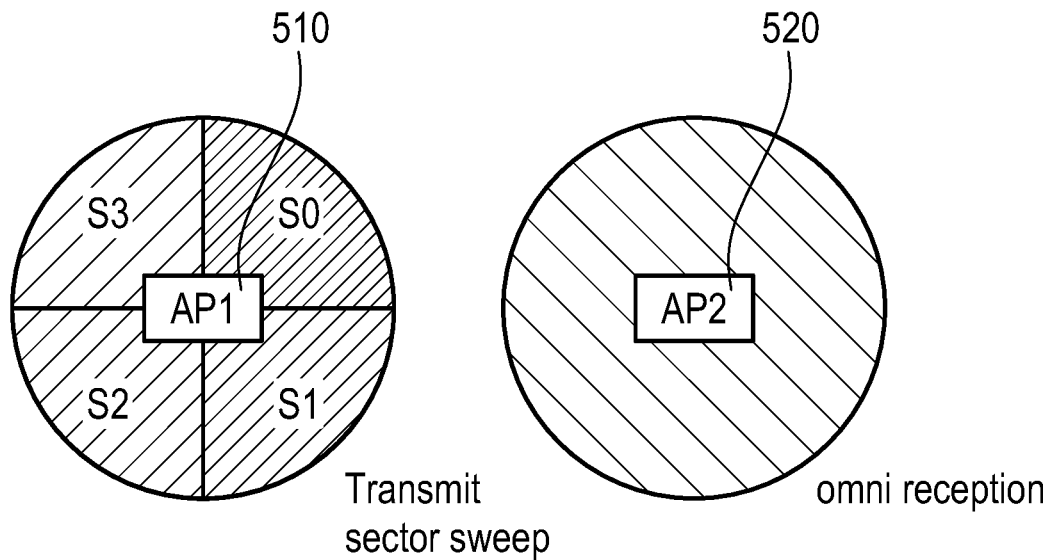
FIG. 5a shows in a schematic diagram a transmit sector sweep of a first communication device acting as network coordinator and a second communication device listing to the sweep omni-directionally.

FIG. 5a shows in a schematic diagram a transmit sector sweep of a first communication device acting as network coordinator and a second communication device listing to the sweep omni-directionally.

In the exemplary embodiment of FIG. 5a, the first and the second communication device 510, 520 are access points denoted here as AP1 and AP2, respectively. The AP1 and AP2 operate in close vicinity to each other.

Without loss of generality, AP1 is assumed to be in BTI of the BHI and performs a transmit sector sweep, i.e. it transmits various sector sweep (SSW) frames as part of beacon frames. Each SSW frame is transmitted with a particular beam that is associated with a transmission sector having a unique sector label (S0 to S3). AP2 receives omni-directional while listening to AP1's BTI.

While receiving, AP2 denotes the reception quality of each received frame and generates a sector quality table holding the associated sector label of said frame and quality indicator indicative of the reception quality of the received frame. For instance, in FIG. 5a, when assuming line-of-sight (LOS) propagation only, the sectors S2 and S3 come with much lower receive quality than S0 and S1.

After AP2 has obtained the sector quality table, it extracts information of the schedule information of AP1. In addition to normal scheduling information, AP1 adds transmit beam information for each allocation, i.e. AP1 advertises the transmit sector label (S0 to S3) which will be used for the particular allocation. Typically, the number of sectors swept during BTI is low and applied beams are rather coarse compared to the beams used for communication. The advertised transmit sector label refers to the sectors trained in BTI, i.e. in case much finer beams are used for communication within an allocation, the advertised sector label shall be that sector label which has been trained in BTI and comprises the fine beam.

By knowing the sector quality table and having the received ESE including the transmit beam information, AP2 has several options to schedule access periods such that interference is avoided or kept low. The options and an exemplary sector quality table will be described later on with reference to FIG. 6.

Figure 5B:
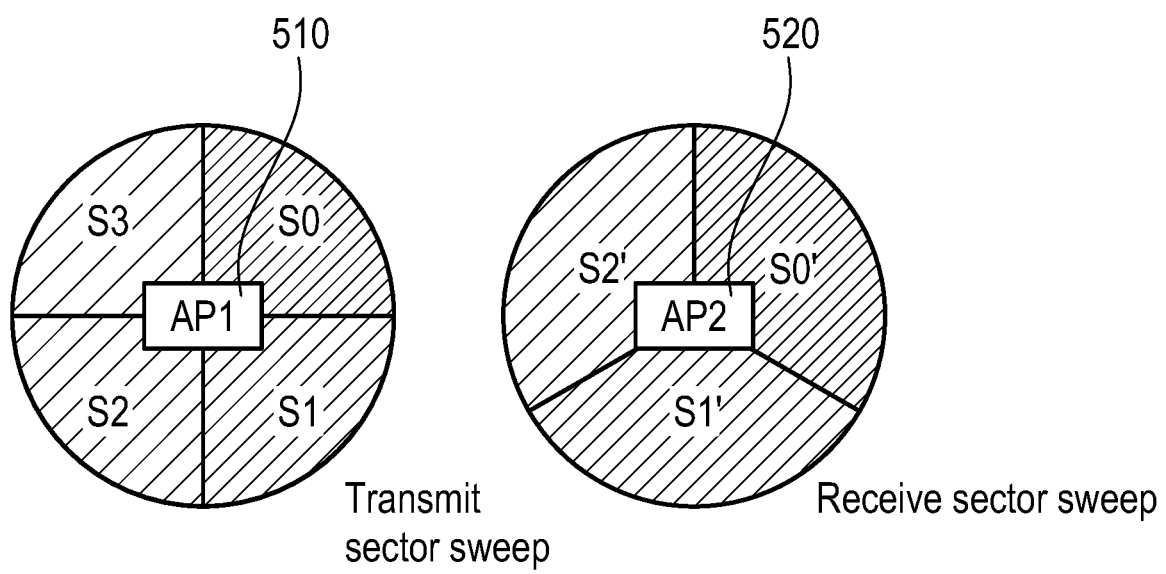
FIG. 5b shows in a schematic diagram a transmit sector sweep of a first communication device acting as network coordinator and a receive sector sweep of a second communication device operating in close vicinity to the first communication device.

FIG. 5b shows in a schematic diagram the same constellation as shown in FIG. 5a with a first and a second access point 510, 520 operating in close vicinity to each other.

However, in the exemplary embodiment according to FIG. 5b, AP2 is able to train several receive beams during BTI. In other words, when AP1 performs a transmit sector sweep, AP2 performs a receive sector sweep. Receive beam training can be implemented either by AP2 varying receive beams during receive training sequences (TRN-R) appended to beacon frames or by varying receive beams successively over various beacon intervals.

By means of the receive sector sweep, AP2 can refine the sector quality table by adding receive sector information (S0' to S2'). Accordingly, a sector quality table according to this embodiment may hold not only a quality indicator for each transmit sector, but a quality indicator for each transmit/receive sector pair.

Typically, transmit beams used in BTI are rather coarse. One method to achieve a fine granular training for e.g. spatial reuse is to use joint transmit and receive training sequences (TRN-T/R) which allow a spatially very fine granular sector quality table (600).

It shall be noted that sectors and sector properties as shown in FIG. 5a and FIG. 5b are for illustration purpose only and may vary depending on implementation.

FIG. 6 shows an exemplary sector quality table 600 based on the example as shown in FIG. 5b.

It is assumed that beam reciprocity holds for both AP1 and AP2, respectively i.e., that the best transmit beams are also the best receive beams. According to the geometrical position as illustrated in FIG. 5b and considering LOS propagation, a qualitative sector quality table 600 according to FIG. 6 can be derived.

The 1st column 610 of the sector quality table 600 denotes the transmit sector of AP1 and the 2nd column 620 denotes the receiving sector of AP2. In this exemplary embodiment, for each transmit sector (S0 to S3) all receiving sectors (S0' to S2') are being considered.

The 3rd column 630 holds a quality indicator indicative of the receive quality within the receiving sector of AP2 with respect to the transmit sector of AP1. Accordingly, the 3rd column holds an entry for each transmit/receive sector pair indicative of the respective receive quality. The receive quality may be measured in terms of RSSI (received signal strength indicator), SNR (signal to noise ratio), or a capacity measure. In this preferred embodiment the quality indicator may be one of three levels. The first level is denoted here by "−" and indicates that the reception quality is below a defined lower bound threshold. The second level is denoted here by "+" and indicates that the reception quality is above a defined upper bound threshold. Finally, the third level is denoted here by "o" and indicates that the reception quality is between the upper bound and the lower bound threshold.

It shall be noted that the quality indicator is not limited to the disclosed three levels and that other means of denoting the quality information are conceivable. In another embodiment, for instance, only two levels "+" and "−" are conceivable without an intermediated level. Yet in another embodiment, the quality indicator may be represented by an absolute value of the receiving strength for a given sector pair. Furthermore, it shall be noted that any threshold may be adjustable such that the quality indicator becomes dynamic and can be adjusted accordingly.

The 4th column 640 finally indicates whether a given sector pair of AP1 and AP2 can be used simultaneously in a spatial reuse scenario. "Yes" stands for spatial reuse feasible, "No" indicates that spatial reuse is not feasible. "N/A" indicates that based on the available information it can not clearly be determined whether spatial reuse for a schedule service period is feasible, or not. The default in this case is to not allocate scheduled data transfer periods simultaneously for these sectors and to do without spatial reuse. Alternatively, further information may be acquired by AP2 in order to refine the assessment whether spatial reuse is feasible or not. An example of the latter is given below.

Since it is favorable to use only a few beams which cover a wide spatial area during beacon transmission in BHI, the applied beams during data communications are generally significantly finer. This fact can be considered for spatial reuse, as wide beams have typically a lower gain compared to fine beams and vice versa. Accordingly, the sector quality table 600 may change from beacon measurement phase to data communication phase. In other words, the sector quality table 600 may be refined based on additional information acquired by AP2 indicative of detailed transmission information from AP1 regarding transmit power and/or gains used during data transmission phase.

In measurement phase (indicated in the following by a prime in the formulas) during BHI of AP1, AP2 measures the following receive strength (all values given in logarithmic scale, e.g. dB or dBm):

$$P'_{AP2,RX} = P'_{AP1,TX} - a_{FS} + G'_{AP1,TX} + G'_{AP2,RX}$$

Here, G denotes the gain of the transmit or receive beam at AP1 or AP2, respectively.

Moreover, P denote transmit power of AP1 and $a_{FS}$ free space attenuation.

In data communication phase (indicated here by double-prime), AP2 measures a different receive strength, namely $$P''_{AP2,RX} = P''_{AP1,TX} - a_{FS} + G''_{AP1,TX} + G''_{AP2,RX} \quad (1)$$

It shall be noted that all parameters except free space attenuation may be different. Therefore, a correction term shall be introduced which gives the relation between measurement and data communication phase as indicated by the following A:

$$\Delta = P''_{AP1,TX} - P'_{AP1,TX} + G''_{AP1,TX} - G'_{AP1,TX} + G''_{AP2,RX} - G'_{AP2,RX} \quad (2)$$

Generally speaking, parameter Δ depends on beam properties and how beams are aligned as well as potentially different AP transmit power. In the sense of a worst case scenario, this fact can be omitted and Δ can be bounded by maximum values for those values accounted positively and by minimum values for those accounted negatively.

It shall be noted that computation of A requires signaling, as all parameters except $G''_{AP2,RX}$ and $G'_{AP2,RX}$ are unknown to AP2. Thus all other parameters need to be conveyed appropriately.

Given that AP2 measures a receive strength of $P_{AP2,RX}$ in the measurement phase for a given sector pair. It shall consider a sector to be suitable for spatial reuse if $$P_{AP2,RX} + \Delta < \text{Threshold} \quad (3)$$

holds and to be not suitable for spatial reuse if the inequality is violated. An appropriate threshold may be the carrier clear assessment (CCA) level.

Figure 7:
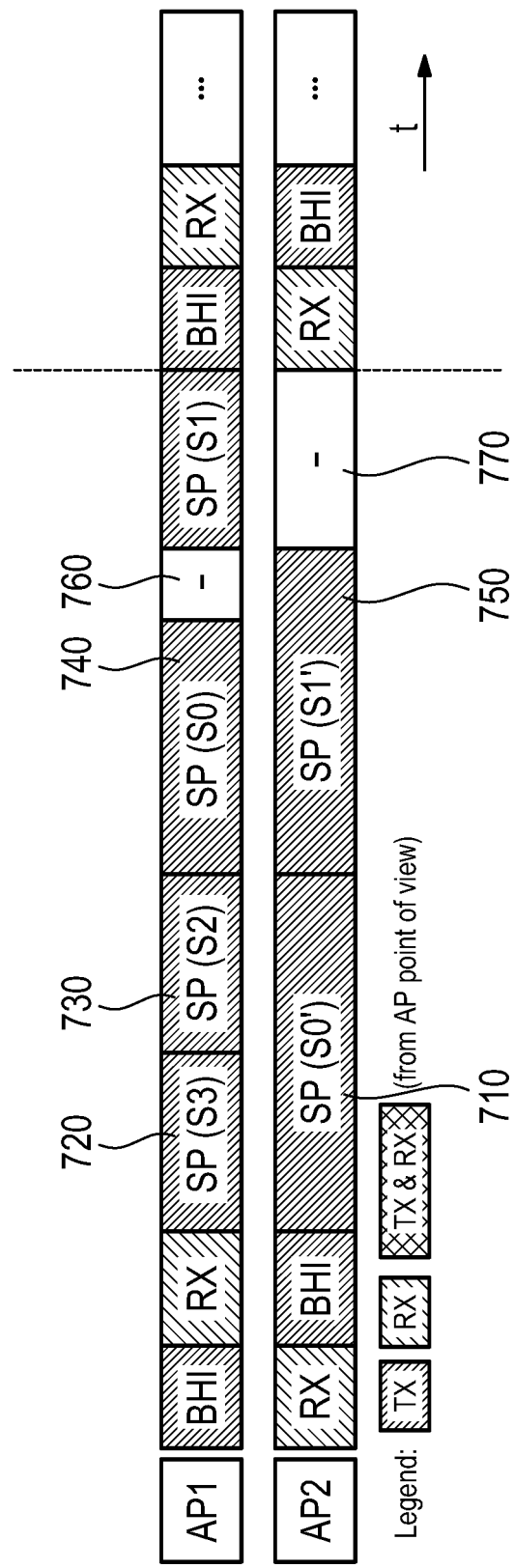
FIG. 7 shows an exemplary allocation of scheduled data transfer periods using spatial reuse.

Based on the exemplary sector quality table 600 according to FIG. 6, FIG. 7 shows an exemplary allocation using spatial reuse. Similar to FIG. 3, FIG. 7 shows in a schematic diagram the different transmission (Tx) and reception (Rx) periods of two network coordinators (AP1 and AP2) over time t and their allocation of SPs. The SPs in this case are partially directional SPs, which are scheduled simultaneously.

According to the exemplary allocation of FIG. 7, AP2 schedules a first directional SP 710, in which it transmits to a station using a beam of sector S0', simultaneously with a first 720 and a second directional SP 730 of the AP1, in which the AP1 transmits to a station using transmission beams of sectors S3 and S2. Subsequently, AP1 schedules a directional SP 740 simultaneously with a directional SP 750 of AP2. Afterwards, AP1 backs off and schedules no SP for a time slot 760, since S1-S1' would cause interference according to the exemplary sector quality table 600 of FIG. 6. After the directional SP 750 of AP2, AP2 backs off in following period 770, because there is nothing to transmit with S0'.

It shall be noted that in the exemplary allocation according to FIG. 7 only downlink (DL) data traffic is considered, i.e. traffic from the APs to stations. This is a preferred constellation for spatial reuse of SPs, since defining spatial reuse for uplink (UL) data transmission is noticeably more complex. Furthermore, it shall be noted that the exemplary allocation according to FIG. 7 only illustrates one example of a possible allocation and that other allocations are feasible. Generally, any AP shall refrain from doing spatial reuse for a particular SP or all SPs if link quality of one or more allocations gets worse or if interference is noticed.

So far only a simple scenario (Fast DL) has been considered which allows for a simple spatial sharing based only on directional and scheduling information, but no side information from the STAs. In this scenario the SPs of AP1 as well as the SPs of AP2 are DL SPs and AP2 is allowed to schedule orthogonal SPs to the ones of AP1 based on the sector quality table. The advantage of this scheme is low overhead; however, it cannot be guaranteed that SPs scheduled in this manner are fully interference free. In other words, more complex scenarios are conceivable in which the approach as disclosed so far may not provide enough protection to stations that share SPs. Therefore, a more refined approach (Safe DL) is provided in the following.

Similar to the Fast DL scenario, in the Safe DL scenario all SPs of AP1 as well as the SPs of AP2 are DL SPs, however, the stations are also listening to the transmission intervals and the scheduling information and allow their APs to make use of the acquired information for the scheduling process. This scheme offers better interference protection with respect to the Fast DL scenario, however, with an increased signaling overhead.

Figure 8:
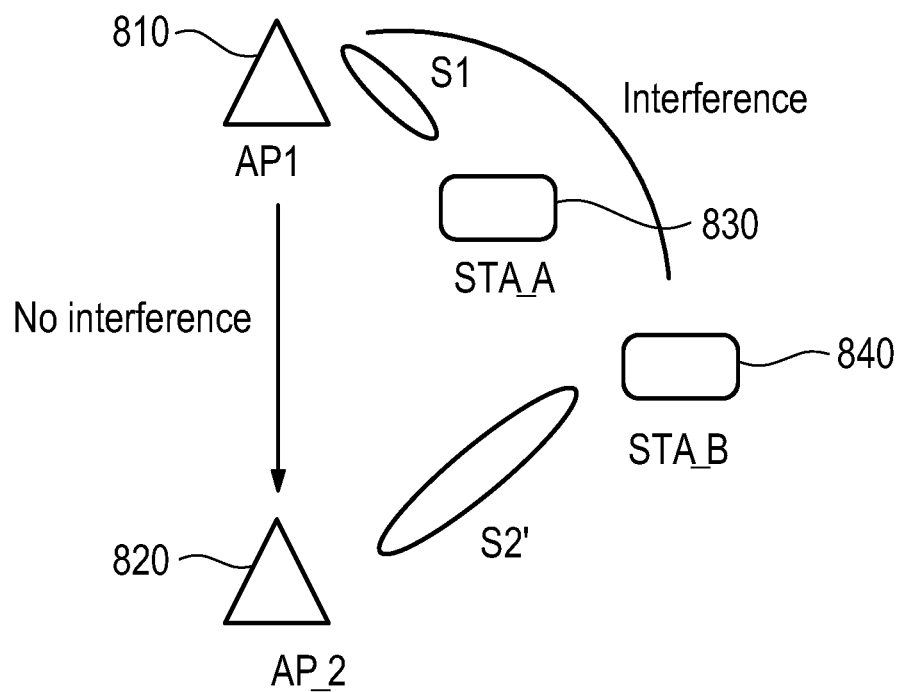
FIG. 8 shows an example of a scenario with residual interference.

FIG. 8 shows an example of a scenario with residual interference, in which Safe DL may be applied. FIG. 8 shows a first and a second access point 810, 820 denoted as AP1 and AP2, respectively. Furthermore, FIG. 8 shows a first station 830 associated with the first access point 810 and a second station 840 associated with the second access point 840.

The first and the second station 830, 840 are denoted as STA_A and STA_B, respectively. Access point AP1 and station STA_A form a first basic service set and access point AP2 and station STA_B form a second basic service set.

In the scenario according to FIG. 8, AP1 aims to serve STA_A whereas AP2 aims to serve STA_B. Using the Fast DL scheme, AP2 decides that a DL SP utilizing a beam in sector S2' can be scheduled simultaneously with an SP using a beam in sector S1 from AP1, since during the beacon listening phase, the beam corresponding to S1 was not properly received by AP2 while listening with the beam corresponding to S2'. However, when transmitting with S2' it may interfere the reception of STA_A whereas also STA_B may experience interference from AP1.

In one embodiment a first possible solution may be provided by allowing AP2 to use only protected DMG or EDMG mode. This implies that before transmitting the SP with S2' both the AP2 and STA_B listen to the channel for a certain amount of time. If AP2 receives no signal during the listening period it sends an RTS request to STA_B. If STA_B does not receive any signal during the interval corresponding to the listening period it replies with a CTS within a defined short interframe space SIFS. After one or more failed RTS/CTS attempts on a directional SP, AP2 may decide to block the respective SP when S1 is used or use an alternative sector. Protected periods are defined in the context of clustering, however, additions should be made to allow their use in the relaxed context as presented here.

Figure 9:
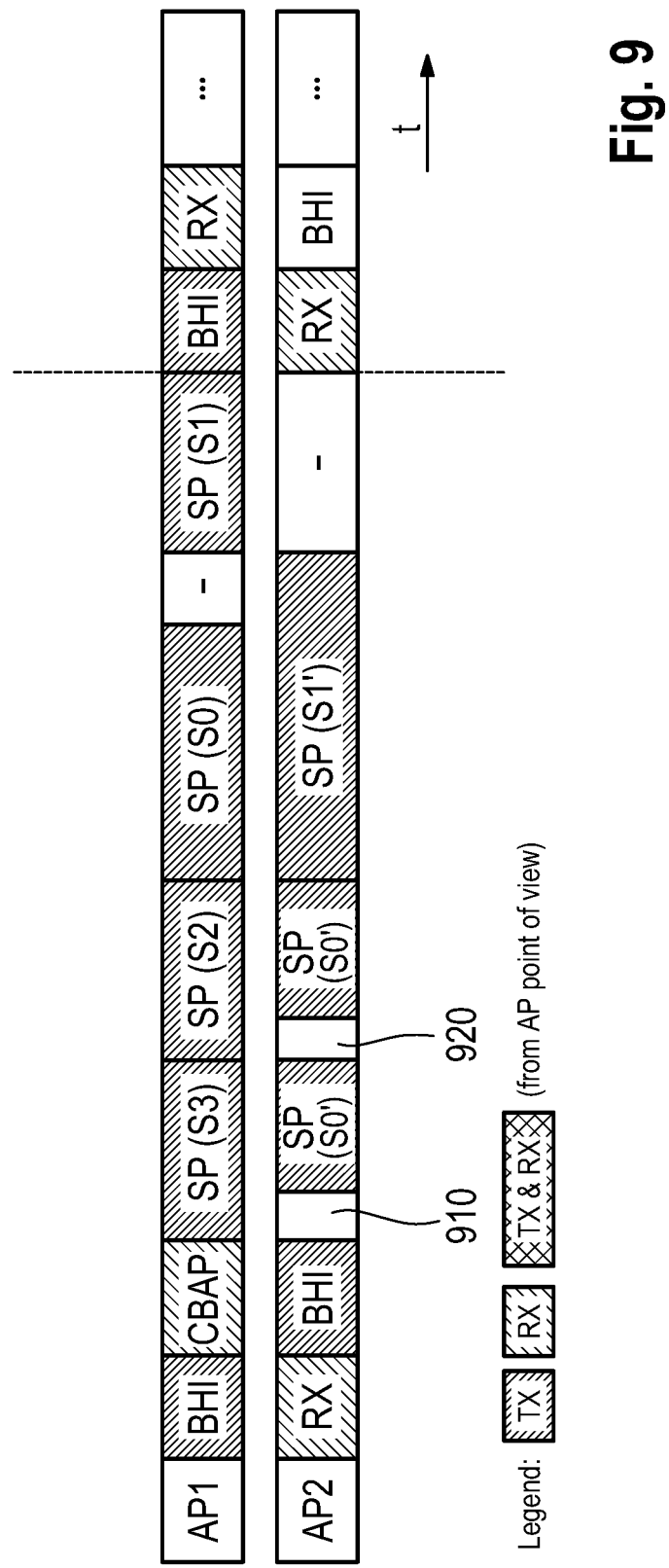
FIG. 9 shows an exemplary allocation of scheduled data transfer periods using a protected mode for transmission during a directional scheduled data transfer period.

FIG. 9 shows an exemplary allocation using a protected mode for transmission during a directional scheduled data transfer period. Here, AP2 schedules defined periods 910, 920 for listing to the medium and/or RTS/CTS negotiation.

Accordingly, in this embodiment AP2 and/or the STAs served by the AP2 may use a protected mode for transmission during a directional scheduled data transfer period which is scheduled simultaneously with a scheduled data transfer period of AP1. The protected mode may be implemented by AP2 by listening before initiating a transmission or a message exchange negotiation, and by deferring transmission if, during the directional scheduled data transfer period, signals of a power larger than a threshold have been sensed. A protection mode at the STA implies listening to the medium at the beginning of the directional scheduled SP for a predefined time interval and not replying with a CTS, if the signal level detected during the listening interval is above a certain threshold. If AP2 has not received the CTS from a station which it intends to serve during the directional scheduled data transfer period, it cancels or defers transmission during the directional scheduled SP. The time intervals in which the AP and STAs are listening to the medium can be signaled by AP or can be defined in a standard. Further, these intervals can be defined by the level of confidence in the measurements and possibility of using spatial sharing.

According to another embodiment, a second solution for the scenario according to FIG. 8 may be provided by utilizing side information from the stations. STA_B may listen to the schedule information (e.g. the ESE) of AP1 and create a sector quality table on its own, using a similar procedure as the one described with regard to the access points. Having this information, STA_B informs AP2 about the beacon beams for which it assesses that interference will be received. This information can either be sent as an unsolicited interference report by the STA_B to AP2 or it can be requested by AP2. After having received this additional information, AP2 can schedule directional SPs such that both AP1 and STA_A experience no or an acceptable amount of interference. It can be useful in this case to allow both LOS and standard measurements of the beacon beams. Measuring on the LOS tap may be used in assessing if potential interference will be created to STAs within LOS of AP1 within the sector covered by S1.

In this embodiment a station may be configured to decode schedule information received from a communication device acting as network coordinator and to determine if a scheduled data transfer period within the schedule information is a directional scheduled data transfer period, the directional scheduled data transfer period being meant for spatial sharing. Further, the station may listen for signals of a power larger than a defined threshold before transmitting in a directional scheduled data transfer period, and respond to a request-to-send/clear-to-send negotiation only if the power of the signals is below the defined threshold. Finally, the station may be configured to inform the communication device acting as a network coordinator of a conflict in the directional scheduled data transfer period.

Accordingly, a station in this embodiment may be further configured to listen to a training and control period of a communication device which is acting as a wireless network coordinator of a basic service set and transmits beacon frames, each of which being associated with a transmit sector, to generate interference information based on the reception quality of the transmitted beacon frames and the associated transmit sector, and to share the interference information with the communication device which is acting as the wireless network coordinator of the basic service set.

Finally, in yet another embodiment, a third possible solution for the scenario according to FIG. 8 may be provided in which AP2 listens to the directional association intervals in addition to the beacons. For instance, AP1 schedules a directive association SP on beam S1 on which STA_A will attempt to associate. AP2 listens with beam S2' and, if allowed, with several neighboring beams/candidate beams that it had previously deemed as good for communication based on the interference condition according to equation (3). If no signal is detected, it will use beam S2'. If a signal is detected it will refrain from using S2'. Alternatively, the AP may use a power control method by which it first assesses if the power required to send towards the STAs within the sector S2' can be made small enough to not interfere towards the detected sector and schedule directional SP towards its STAs. During the scheduled transmission, the power level will be adjusted accordingly.

Figure 10:
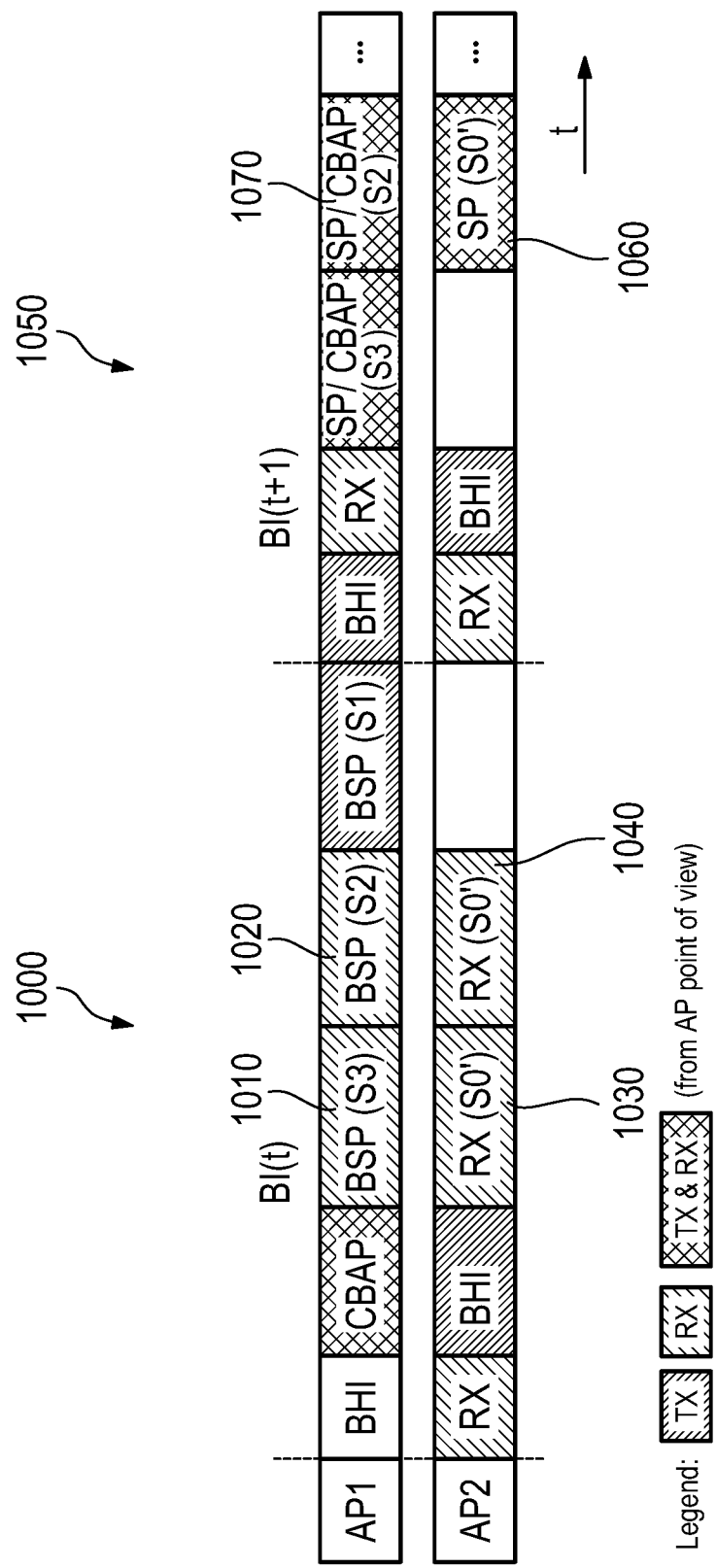
FIG. 10 shows an exemplary allocation of scheduled data transfer periods using spatial reuse with directional association intervals.

FIG. 10 shows an exemplary allocation in which AP2 listens to directional association intervals of AP1. According to the illustrated allocation, AP1 has scheduled within a first beacon interval 1000 two periods 1010, 1020 for beamforming training with stations attempting to associate with AP1. During the first period 1010 AP1 uses receive beams in S3, to allow the STAs in this sector to associate. Subsequently, during a second period 1020 AP1 uses receive beams within S2. Simultaneously, AP2 listens to the beamforming training, in this example, with beams in sectors S0' and determines for the first period 1030 that interference are received and for the second period 1040 that no interferences are received.

Accordingly, AP2 generates a spatial sharing schedule for the following beacon interval 1050 and schedules its SPs such that interference can be reduced or avoided. Here, a scheduled data transfer period 1060 using sector S0' of AP2 is scheduled simultaneously with a SP/CBAP 1070 using sector S2 of AP1, since no interference have been determined for this constellation. The receive beams on which AP2 listens to the directional allocation intervals may be chosen from the ones it has deemed as good for communication, based on the methods presented above. Therefore AP2 can refine its decision without significant increase in processing.

A network coordinator according to this embodiment may hence be configured to listen to one or more directional association intervals scheduled by the further network coordinator in which stations within a sector indicated in the respective directional association interval are allowed to transmit in order to associate to the further network coordinator, in order to allow stations within the respective sector to associate, to generate further interference information by denoting reception beams as being interfered when a signal is detected while listening to the directional association interval, and to refine the schedule based on the further interference information.

It shall be noted that while the different solution have been presented as individual embodiments, it is also conceivably that the solutions may be combined fully or partially in a meaningful manner in a single embodiment.

As outlined above, the proposed spatial reuse schemes Fast DL and Safe DL so far only work for downlink data traffic from the APs to STA(s). The reason is that the APs perform bilateral beam alignment without considering STA beams. As STAs have a random distribution around the APs and their orientation with respect to beam directions is typically unknown, it is very complex to define spatial reuse also for uplink (UL) data traffic, i.e. transmissions from a STA to an AP. For that reason, in a preferred embodiment spatial reuse is only applied in DL scenarios.

In order to also support bidirectional links, SPs are assumed to be split in pure DL SPs and a joint DL/UL or pure UL SPs. During such an SP only a single AP receives (pure UL SP) or transceives (joint DL/UL SP) whereas all other APs back off for not interfering with the communicating STAs. The general principal is illustrated in FIG. 11.

Figure 11:
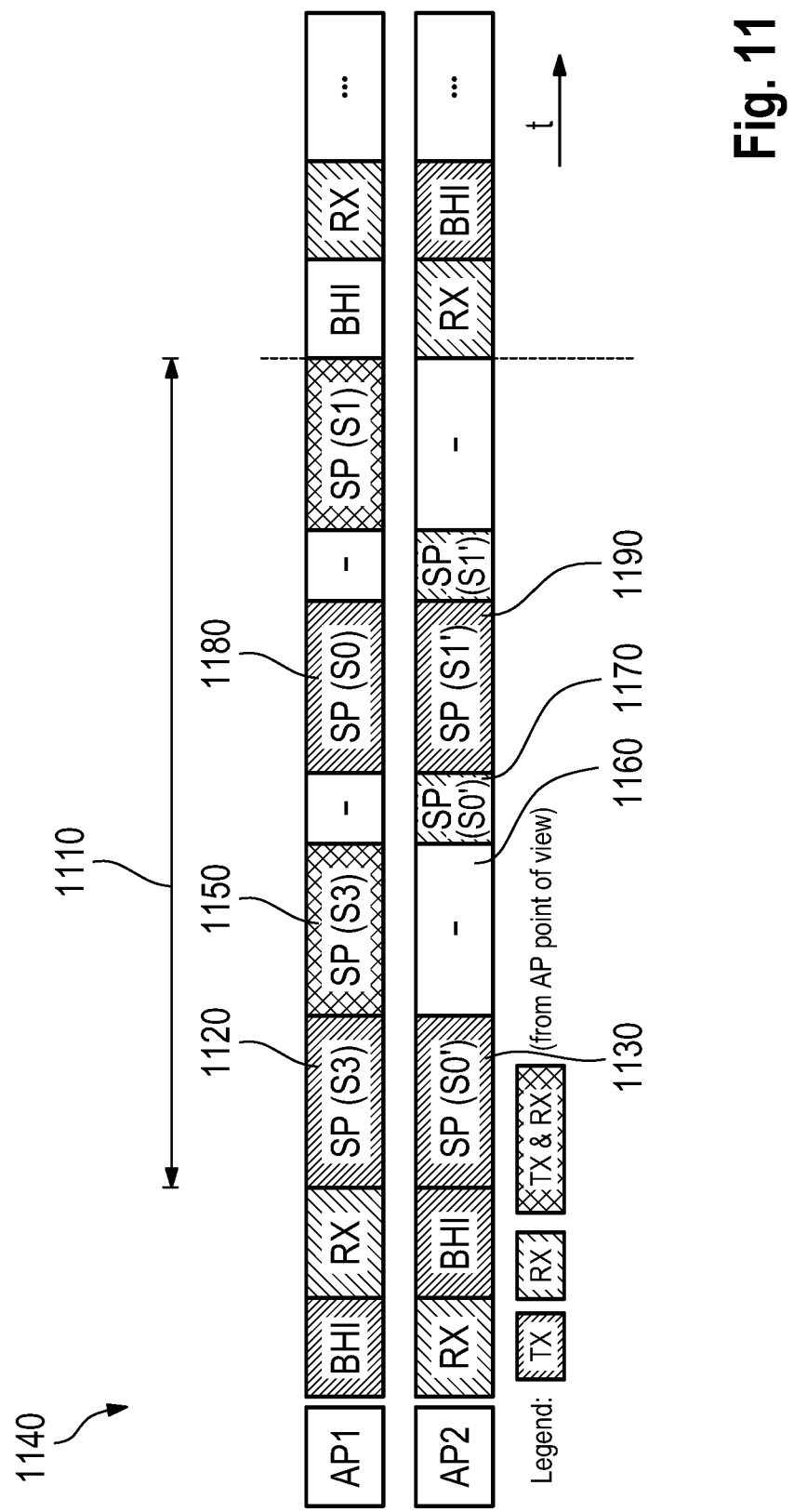
FIG. 11 shows an exemplary allocation of scheduled data transfer periods using spatial reuse with additional bidirectional scheduled data transfer periods.

FIG. 11 shows an exemplary allocation using spatial reuse with additional bidirectional scheduled data transfer periods. Here, in the data transmission phase 1110, an AP may schedule pure DL SPs simultaneously, whereas those SPs which are used bidirectionally (i.e. DL and UL) or unidirectionally for uplink are kept free by the other APs to avoid any interference.

In the given example, the first SP 1120 of AP1 and the first SP 1130 of AP2 in the first beacon interval 1140 are scheduled simultaneously (because both are DL SPs). However, the second SP 1150 of AP1 is a bidirectional SP, and hence AP2 does not schedule a SP of its own simultaneously as indicated here by the blank box 1160. The second SP 1170 of AP2 in the first beacon interval 1140 is a unidirectional uplink SP, and hence AP1 does not allocate any SPs in this period. Subsequently, pure DL SPs 1180, 1190 are scheduled simultaneously followed again by a joint DL/UL SP and a pure UL SP that are scheduled not overlapping in time.

In scenarios in which DL data traffic dominates (e.g. content distribution such as video), a bidirectional link is rarely used. Very often a UL connection is limited to a STA transmitting an acknowledgement (ACK). This means that UL phases are only rarely included in a beacon interval and have short durations. Also different variants of an ACK exist. STAs can for example acknowledge successful reception of several earlier DL data transmissions by using a block ACK (BACK). A BACK consists typically of a BACK request by the AP in DL which is acknowledged immediately by a STA in UL. A BACK window which is the number of simultaneously acknowledged DL transmissions is variable and can extend over several beacon intervals. For that reason it is possible to have a common BACK interval in a joint UL/DL SP with varying STA responding. An exemplary allocation which is applying this principal is depicted in FIG. 12

Figure 12:
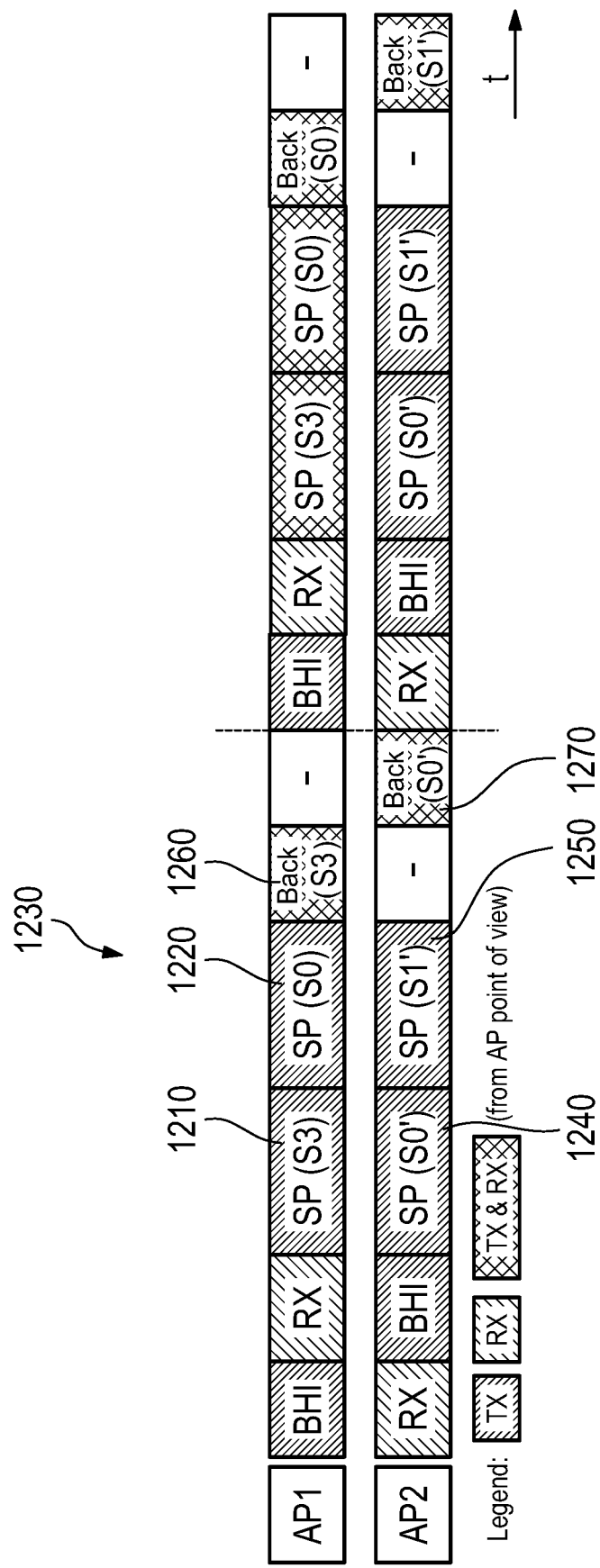
FIG. 12 shows an exemplary allocation of scheduled data transfer periods, in which pure downlink scheduled data transfer periods are arranged using spatial reuse with BACK concept being applied.

FIG. 12 shows an exemplary allocation where pure downlink scheduled data transfer periods are arranged using spatial reuse in a beacon interval with a final common BACK period. In this example, AP1 schedules two SPs 1210, 1220 serving sector S0 and sector S3 in the first beacon interval 1230 and AP2 schedules two SPs 1240, 1250 serving S0' and S1' simultaneously. Subsequently, each AP schedules a joint UUDL SP 1260, 1270 for various stations being able to transmit a BACK for the last two DL SPs. The joint UL/DL SP 1260, 1270 are scheduled in a non-overlapping manner.

It shall be noted that in WLAN communication, for instance according to IEEE802.11 standard, a scheduled data transfer period as referred to in this disclosure may correspond to a scheduled service period, a training and control period may correspond to a beacon header interval, and (data transfer) schedule information may correspond to an extended schedule element. Further a group of communication devices in the meaning of this disclosure can be a basic service set.

Finally, in order to implement the disclosed functionality in a wireless communication standard such as the IEEE802.11, the following features may be included therein:
    Indication in an ESE if the SP is spatial reuse capable i.e. is a DL only SP.

Inclusion of transmit sector information into the ESE for each SP which is spatial reuse capable, wherein for APs having beam reciprocity, i.e. transmit beams are equal to receive beams, the indication of a receive sector information can be reused.

Signaling of parameters such as $P''_{AP1,TX}$, $P'_{AP1,TX}$, $G''_{AP1,TX}$, $G'_{AP1,TX}$ or linear (if in logarithmic scale) or multiplicative (if in linear scale) dependencies of those values in order to compute $\Delta$.

Generally, for fair allocation, each AP should further leave some time unallocated which can be exploited by the other AP for joint DL/UL or UL allocations. Furthermore, a message exchange between both APs during BHI can be envisioned which contains a request from an AP to another AP to free resources within the DTI for the use of spatial sharing.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Communication device (110) for communicating within a group of communication devices (130), the communication device comprising circuitry configured to
    listen to a training and control period of a further communication device (120) which is acting as a wireless network coordinator of a further group of communication devices (140) and transmits frames with a succession of directive beams, each identified by a transmit sector,
    generate reception quality information associating each transmit sector with a quality indicator indicative of a reception quality of the received frames,
    obtain scheduling information from the further communication device (140) including at least one scheduled data transfer period with transmit sector information associated therewith, and
    generate scheduled data transfer periods for the group of communication devices (130) based on the reception quality information and the scheduling information, including the transmit sector information, such that interference levels at the further communication (120) device and/or another communication device are minimized.

2. Communication device according to (1),
    wherein at least one scheduled data transfer period of the communication device is a directional scheduled data transfer period, which is scheduled simultaneously with the at least one scheduled data transfer period of the further communication device.

3. Communication device according to any one of (1) or (2),
    wherein the circuitry is further configured to
    receive transmission information from the further communication device regarding transmit power and/or gains of a transmission in the at least one scheduled data transfer period of the further communication device, and
    select the scheduled data transfer periods based on the transmission information from the further communication device.

4. Communication device according to (3),
    wherein the transmission information is indicative of transmit power and antenna gains used during a control mode transmission and/or of transmit power and gains to be used during a directional data transmission.

5. Communication device according to any one of (1) or (4),
    wherein the quality indicator is indicative of the link quality which is determined by either of a received signal strength indicator (RSSI), a signal to noise ratio (SNR) or a capacity measure.

6. Communication device according to any one of (1) or (5),
    wherein the circuitry is further configured to
    use a protected mode for transmission during a directional scheduled data transfer period of the communication device which is scheduled simultaneously with a scheduled data transfer period of the further communication device.

7. Communication device according to (6),
    wherein the circuitry is configured for the protected mode to
    listen to a medium for a predefined time interval after the start of the directional scheduled data transfer period, before initiating a transmission or a message exchange negotiation, and
    defer transmission if, during the predefined listen interval, signals of a power larger than a threshold have been sensed and/or if the communication device has not received a clear channel acknowledgement from a communication device of the group of communication devices it intends to serve during the directional scheduled data transfer period.

8. Communication device according to any one of (1) or (7),
    wherein the circuitry is further configured to receive interference information from a communication device acting as a station of the group of communication devices, and refine the scheduled data transfer periods based on the interference information from said station.

9. Communication device according to (8), wherein the interference information corresponds to further reception quality information acquired by the station that is also listening to the training and control period of the further communication device and that is associating one or more of the transmit sectors with a quality indicator indicative of a reception quality of the directional beams, carrying the beacon frames, by the station.

10. Communication device according to any one of (1) to (9), wherein the circuitry is further configured to listen to one or more directional association intervals scheduled by the further communication device (120) in which stations within a sector indicated in the respective directional association interval are allowed to transmit in order to associate to the further communication device (120), in order to allow stations within the respective sector to associate, generate further interference information by evaluating reception beams as being interfered when a signal is detected while listening to the directional association interval, and refine the scheduled data transfer periods based on the further interference information.

11. Communication device according to any one of (1) to (10), wherein the circuitry is further configured to listen with receive beams corresponding to one or more direction during the transmission of each frame of the further communication device in order to obtain receive sector information, and refine the reception quality information using the receive sector information.

12. Communication device according to any one of (1) to (11), wherein the scheduled data transfer periods include directional scheduled data transfer periods which are scheduled simultaneously with the at least one scheduled data transfer period of the further communication device only when schedule information from the further communication device extracted from the training and control period includes only downlink scheduled data transfer periods which indicate time slots in which data is transferred from the further communication device to another communication device which is communicating with the further communication device.

13. Communication device according to (12), wherein the scheduled data transfer periods include only directional scheduled data transfer periods which indicate time slots in which data is transferred from the communication device to a to another communication device which is communicating with the communication device.

14. Communication device according to any one of (1) to (13), wherein the scheduled data transfer periods generated by the communication device and scheduled data transfer periods according to schedule information from the further communication device extracted from the training and control period include at least one of the group consisting of downlink scheduled data transfer periods, uplink scheduled data transfer periods and joint uplink and downlink scheduled data transfer periods, the downlink scheduled data transfer periods indicating time slots in which data is transferred from the communication device to a station, the uplink scheduled data transfer periods indicating time slots in which data is transferred from the station to the communication device, and joint uplink and downlink scheduled data transfer periods indicating time slots in which data is bidirectional exchanged between the communication device and a station, and wherein the at least one scheduled data transfer period of the communication device and the at least one scheduled data transfer period of the further communication device, which are scheduled simultaneously, are spatial reuse capable.

15. Communication device according to any one of (1) to (14), wherein the circuitry is further configured to utilize the scheduling information obtained from the further communication device in order to protect time slots in which a communication device willing to associate with the group of communication devices is allowed to perform directive association.

16. Communication device according to any one of (1) to (15), wherein the other communication device is a device served by the communication device and/or a device aiming to associate to the communication device.

17. Communication method for a communication device (110) communicating within a group of communication devices (130), the method comprising the steps of:

listening to a training and control period of a further communication device (120) which is acting as a wireless network coordinator of a further group of communication devices (140) and transmits frames with a succession of directive beams, each of which being associated with a transmit sector, generating reception quality information associating each transmit sector with a quality indicator indicative of a reception quality of the received frames, obtaining scheduling information from the further communication device including at least one scheduled data transfer period with transmit sector information associated therewith, and generating scheduled data transfer periods for the group of communication devices (130) based on the reception quality information and the scheduling information, including the transmit sector information, such that interference levels at the further communication device (120) and/or another communication device is minimized.

18. Communication device (120) acting as a wireless network coordinator comprising circuitry configured to generate schedule information which schedules scheduled data transfer periods for a data transfer interval of an transmission interval, indicate within the schedule information scheduled data transfer periods capable of spatial reuse, associate transmit sector information with each scheduled data transfer period capable of spatial reuse, and transmit the schedule information for the transmission interval as part of a training and control period of said transmission interval.

19. Communication device (150A, 150B, 150C) within a group of communication devices (130) comprising circuitry configured to decode schedule information received from a communication device acting as network coordinator, and determine if a scheduled data transfer period within the schedule information is a directional scheduled data transfer period and if the directional scheduled data transfer period being capable of spatial reuse/sharing.

20. Communication device (150A, 150B, 150C) according to (19), wherein the circuitry is further configured to listen to a medium for a predefined time interval after the start of a directional service period, and respond to a request-to-send/clear-to-send negotiation only if the measured received power during the predefined time interval is below a defined threshold.

21. Communication device (150A, 150B, 150C) according to (20), wherein the circuitry is further configured to inform the communication device acting as the network coordinator of a conflict in the directional scheduled data transfer period.

22. Communication device according to any one of (19) to (21), wherein the circuitry is further configured to listen to a training and control period of a further communication device which is acting as a wireless network coordinator of a further group of communication devices and transmits frames, each of which being associated with a transmit sector, generate interference information based on the reception quality of the received frames and the associated transmit sector, on one or more directional and/or quasi-omni receive beams, and share the interference information with the communication device which is acting as the wireless network coordinator of the group of communication devices.

23. Communication device according to (22), wherein the circuitry is further configured to receive a request for interference information from the communication device acting as the wireless network coordinator, and transmit the interference information based on said request.

24. A non-transitory computer-readable recording medium that stores therein a computer program product, which, when executed by a processor, causes the method according to (17) to be performed.

The invention claimed is:

1. A communication device for communicating within a first group of communication devices, the communication device comprising:

a communication interface configured to listen to a training and control period of a second communication device which is acting as a wireless network coordinator of a second group of communication devices and transmits frames with a succession of directive beams, each identified by a transmit sector; and circuitry configured to generate reception quality information associating each transmit sector with a quality indicator indicative of a reception quality of frames received from the second communication device;

obtain scheduling information from the second communication device including at least one scheduled data transfer period with transmit sector information associated therewith; and generate scheduled data transfer periods for the first group of communication devices based on the reception quality information and the scheduling information, including the transmit sector information, so as to minimize interference at the second communication device and/or second communication devices of the second group of communication devices caused by transmissions performed by the communication device and/or first communication devices of the first group of communication devices.

2. The communication device according to claim 1, wherein at least one scheduled data transfer period of the communication device is a directional scheduled data transfer period, which is scheduled simultaneously with the at least one scheduled data transfer period of the second communication device.

3. The communication device according to claim 1, wherein the circuitry is configured to:

receive transmission information from the second communication device regarding transmit power and/or gains of a transmission in the at least one scheduled data transfer period of the second communication device; and select the scheduled data transfer periods based on the transmission information from the second communication device.

4. The communication device according to claim 3, wherein the transmission information is indicative of transmit power and antenna gains used during a control mode transmission and/or of transmit power and gains to be used during a directional data transmission.

5. The communication device according to claim 1, wherein the quality indicator is indicative of a link quality which s determined by either of a received signal strength indicator (RSSI), a signal to noise ratio (SNR) or a capacity measure.

6. The communication device according to claim 1, wherein the circuitry is configured to use a protected mode for transmission during a directional scheduled data transfer period of the communication device which is scheduled simultaneously with a scheduled data transfer period of the second communication device.

7. The communication device according to claim 6, wherein the circuitry is configured for the protected mode to:

listen to a medium for a predefined time interval after the start of the directional scheduled data transfer period, before initiating a transmission or a message exchange negotiation; and defer transmission if during the predefined listen interval, signals of a power larger than a threshold have been sensed and/or if the communication device has not received a clear channel acknowledgement from a communication device it intends to serve during the directional scheduled data transfer period.

8. The communication device according to claim 1, wherein the circuitry is configured to:

receive interference information from a communication device acting as a station within the first group of communication devices, and refine the scheduled data transfer periods based on the interference information from the station.

9. The communication device according to claim 8, wherein the interference information corresponds to second reception quality information acquired by the station that is also listening to the training and control period of the second communication device and that is associating one or more of the transmit sectors with a quality indicator indicative of a reception quality of the directional beams, carrying beacon frames, by the station.

10. The communication device according to claim 1, wherein the circuitry is configured to:

listen to one or more directional association intervals scheduled by the second communication device in which stations within a sector indicated in the respective directional association interval are allowed to transmit in order to associate to the second communication device, in order to allow stations within the respective sector to associate;

generate interference information by evaluating reception beams as being interfered when a signal is detected while listening to the directional association interval; and refine the scheduled data transfer periods based on the interference information.

11. The communication device according to claim 1, wherein the circuitry is configured to:

listen receive beams corresponding to one or more direction during the transmission of each frame of the second communication device in order to obtain receive sector information; and refine the reception quality information using the receive sector information.

12. The communication device according to claim 1, wherein the scheduled data transfer periods include directional scheduled data transfer periods which are scheduled simultaneously with the at least one scheduled data transfer period of the second communication device only when schedule information from the second communication device extracted from the training and control period includes only downlink scheduled data transfer periods which indicate time slots in which data is transferred from the second communication device to another communication device which is communicating with the second communication device.

13. The communication device according to claim 12, wherein the scheduled data transfer periods include only directional scheduled data transfer periods which indicate time slots in which data is transferred from the communication device to a to another communication device which is communicating with the communication device.

14. The communication device according to claim 1, wherein the scheduled data transfer periods generated by the communication device and scheduled data transfer periods according to schedule information from the second communication device extracted from the training and control period include at least one of the group consisting of downlink scheduled data transfer periods, uplink scheduled data transfer periods and joint uplink and downlink scheduled data transfer periods, the downlink scheduled data transfer periods indicating time slots in which data is transferred from the communication device to a station, the uplink scheduled data transfer periods indicating time slots in which data is transferred from a station to the communication device, and joint uplink and downlink scheduled data transfer periods indicating time slots in which data is bidirectional exchanged between the communication device and a station, and the at least one scheduled data transfer period of the communication device and the at least one scheduled data transfer period of the second communication device, which are scheduled simultaneously, are spatial reuse capable.

15. The communication device according to claim 1, wherein the circuitry is configured to utilize the scheduling information obtained from the second communication device in order to protect time slots in which a communication device willing to associate with the first group of communication devices is allowed to perform directive association.

16. The communication device according to claim 1, wherein the second communication device is a device served by the communication device and/or a device aiming to associate to the communication device.

17. A communication method for a first communication device communicating within a first group of communication devices, the method comprising:

listening to a training and control period of a second communication device which is acting as a wireless network coordinator of a second group of communication devices and transmits frames with a succession of directive beams, each of which being associated with a transmit sector;

generating reception quality information associating each sector with a quality indicator indicative of a reception quality of frames received from the second communication device;

obtaining scheduling information from the second communication device including at least one scheduled data transfer period with transmit sector information associated therewith; and generating scheduled data transfer periods for the group of communication devices based on the reception quality information and the scheduling information, including the transmit sector information so as to minimize interference at the second communication device and/or second communication devices of the second group of communication devices caused by transmissions performed by the communication device and/or first communication devices of the first group of communication devices.

18. A non-transitory computer-readable recording medium that stores therein a computer program product, which, when executed by a processor, causes the method according to claim 17 to be performed.

19. A communication device acting as a wireless network coordinator for a first group of communication devices, the communication device comprising:

circuitry configured to
generate schedule information which schedules scheduled data transfer periods for a data transfer interval of a transmission interval;
indicate within the schedule information scheduled data transfer periods capable of spatial reuse; and
associate transmit sector information with each scheduled data transfer period capable of spatial reuse; and a communication interface configured to transmit the schedule information for the transmission interval as part of a training and control period of the transmission interval for reception by a second communication device acting as a wireless network coordinator of a second group of communication devices wherein the second communication device generates scheduled data transfer periods for the second group of communication devices based on the received schedule information.

20. A communication device within a first group of communication devices comprising:
    circuitry configured to
        decode schedule information received from a communication device acting as network coordinator; and
        determine if a scheduled data transfer period within the schedule information is a directional scheduled data transfer period and if the directional scheduled data transfer period being capable of spatial reuse/sharing; and
    a communication interface configured to
        listen to a medium fax a predefined time interval after start of a directional service period; and
        respond to a request-to-send/clear-to-send negotiation only if a measured received power during the predefined time interval is below a defined threshold.

21. A communication device according to claim 20, Wherein
    the circuitry is further configured to inform the communication device acting as the network coordinator of a conflict in the directional scheduled data transfer period.

22. The communication device according to claim 20, wherein the circuitry is further configured to:
    listen to a training and control period of a second communication device which is acting as a wireless network coordinator of a second group of communication devices and transmits frames, each of which being associated with a transmit sector;
    generate interference information based on a reception quality of frames received from the second communication device and the associated transmit sector, on one or more directional beams; and
    share the interference information with the communication device which is acting as the wireless network coordinator of the first, group of communication devices.

23. The communication device according to claim 22, wherein the circuitry is further configured to:
    receive a request for interference information from the communication device acting as the wireless network coordinator; and
    transmit the interference information based on the request.

* * * * *